United States Patent [19]

Hammersmith et al.

[11] 4,263,843
[45] Apr. 28, 1981

[54] METHOD AND APPARATUS FOR CONTROLLED REMOVAL OF EXCESS SLURRY FROM ORGANIC FOAM

[75] Inventors: Virginia L. Hammersmith, Monroeville; Richard G. LaBar, Export, both of Pa.

[73] Assignee: Aluminum Company of America, Pittsburgh, Pa.

[21] Appl. No.: 61,646

[22] Filed: Jul. 30, 1979

[51] Int. Cl.³ .............................................. B30B 9/02
[52] U.S. Cl. ..................................... 100/37; 100/54; 100/110; 210/356; 210/406; 264/344
[58] Field of Search ................... 100/37, 54, 104, 110, 100/116; 210/356, 406; 264/344

[56] References Cited

U.S. PATENT DOCUMENTS

| 293,335 | 2/1884 | Knapp | 100/90 X |
|---|---|---|---|
| 2,109,559 | 3/1938 | Wickert, Jr. | 100/116 X |
| 2,251,687 | 8/1941 | Norton | 25/156 |
| 3,877,973 | 4/1975 | Ravault | 264/44 |
| 3,995,544 | 12/1976 | Farley | 100/116 |
| 4,024,212 | 5/1977 | Dore et al. | 264/44 |
| 4,039,452 | 8/1977 | Fernandez | 210/356 X |
| 4,075,303 | 2/1978 | Yarwood et al. | 264/44 |

Primary Examiner—Christopher K. Moore
Attorney, Agent, or Firm—Glenn E. Klepec

[57] ABSTRACT

Method and apparatus for removing excess ceramic slurry from polyurethane foam used as a matrix for ceramic material in manufacturing filters for molten metals such as aluminum. The apparatus comprises a first chamber for retaining a body of polyurethane foam impregnated with a slurry of ceramic material; a second chamber; a slurry-permeable screen between the first and second chambers; and compression means for pressing the polyurethane foam against the screen. By evacuating the second chamber and simultaneously compressing the foam against the screen, slurry is withdrawn from the foam into the second chamber while retaining in the foam an evenly distributed residue of ceramic material.

10 Claims, 8 Drawing Figures

METHOD AND APPARATUS FOR CONTROLLED REMOVAL OF EXCESS SLURRY FROM ORGANIC FOAM

BACKGROUND OF THE INVENTION

The present invention represents an improvement over prior art methods and apparatus for removing excess ceramic slurry from organic foam by passing slurry-impregnated foam through one or more pairs of preset rollers. Such organic foam, which is typically polyurethane foam, serves as a matrix for ceramic material in the manufacture of filters for molten metals, such as aluminum metal.

Prior art methods and apparatus for removing excess ceramic slurry from organic foam are disclosed in Yarwood et al U.S. Pat. No. 4,075,303 and in Dore et al U.S. Pat. No. 4,024,212. Both patents specify a method wherein excess slurry is expelled by passing the foam at least twice through pairs of preset rollers to effect temporary compression. While these patents recognize the necessity for maintaining a uniform distribution of slurry through the foam upon release of compression, it has been found in practice that it is difficult to avoid a core effect (excess slip remaining in a central portion of the foam) after impregnated foam is passed through preset rollers only once or twice. Multiple passes through the rollers are required to obtain foams suitable for manufacturing adequate filters using the methods of these prior art patents.

It is a principal object of the present invention to provide a method and apparatus for removing excess ceramic slurry from a slurry-impregnated organic foam, wherein ceramic material is uniformly distributed throughout the organic foam.

It is a related object of the present invention to avoid the core effect which has plagued prior art methods and apparatus for removing excess slurry from organic foam.

It is an advantage of the present invention that a uniform distribution of ceramic material can be obtained in an organic foam by performing only a single operation, without multiple passes through preset rollers.

Additional objects and advantages of the present invention will become apparent to persons skilled in the art from the following specification, read in conjunction with the drawings.

SUMMARY OF THE INVENTION

In accordance with the present invention, organic foam articles impregnated with an excess of ceramic material in a slurry are inserted into the first chamber of a two-chamber apparatus. A vacuum is applied to the second chamber, and the foam is compressed against a screen separating the first and second chambers, thereby drawing excess slurry from the foam through the screen into the second chamber. After compression is released and the vacuum is removed, a uniformly distributed residue of ceramic material remains in the foam.

The treated foam structure is dried to remove moisture and heated to volatilize the organic matrix. The resulting article is a porous ceramic foam having a multiplicity of empty spaces corresponding to voids in the original organic foam.

BRIEF DECRIPTION OF THE DRAWINGS

DESCRIPTION OF THE PREFERRED EMBODIMENTS

Figure 1:
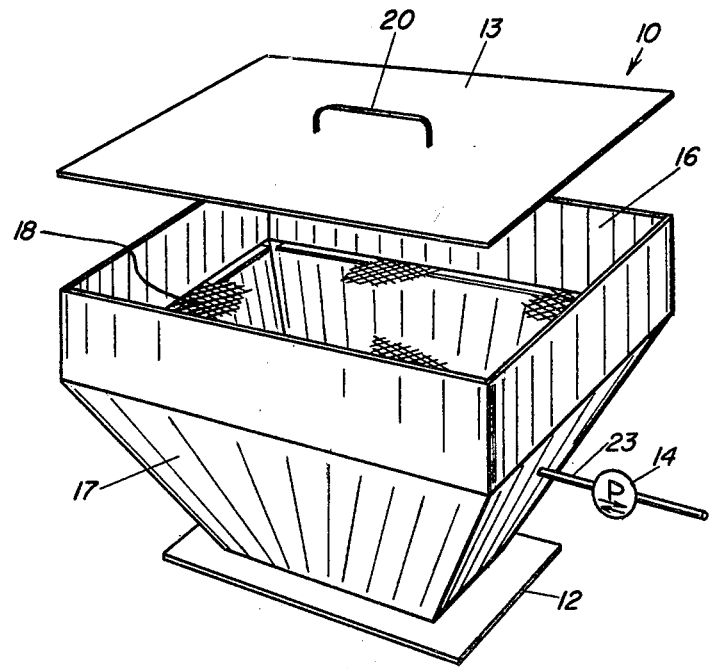
FIG. 1 is a perspective view of the apparatus for expelling excess slurry of the invention.

The foregoing objects and advantages of the present invention are attained by providing the two-chamber apparatus illustrated in FIGS. 1 to 4.

The apparatus 10 includes a principal or body portion 11 supported on a base 12, a lid or compression means 13 covering an open upper portion of the apparatus 10 and a vacuum pump or pump means 14 for selectively withdrawing air from the apparatus 10. The principal portion 11 includes an upper or first chamber 16, a lower or second chamber 17 adjacent the first chamber 16, and a wire mesh screen 18 between the two chambers 16, 17. The vertical sidewalls of the first chamber 16 define a cavity having a length of 12 inches, a width of seven inches and a depth of three inches. Sidewalls of the second chamber 17 taper downwardly and inwardly to meet the base 12. The base 12 is 10 inches long and five inches wide. It will be understood that the preferred shape and precise dimensions given here may be varied considerably to accommodate larger or smaller organic foam pads having the same or different shapes without departing from our invention.

The lid 13 is provided with a handle 20 for manually compressing and lifting the lid 13. Outer dimensions of the lid 13 are slightly less than inner dimensions of the first chamber 16. It is not necessary to machine the lid 13 and first chamber 16 to such close tolerances that an air-tight fit is produced because the walls of the first chamber will abut with outer edge portions of the slurry-impregnated organic foam to seal off the second chamber 17 from the atmosphere. While the present description of our invention is made with reference to a preferred manually operated embodiment, persons skilled in the art will recognize that the method and apparatus described herein is readily adaptable to mechanized and automated operations.

An end wall of the second chamber 17 is provided with an exhaust port 21 for removing air or other gaseous fluid from the chamber 17. A hood 22 extends inwardly of the end wall directly above and to both sides of the port 21 to prevent slurry from entering the port 21 during operation of the apparatus 10. A tubular pipe 23 connects the port 21 to the vacuum pump 14.

Figure 5:
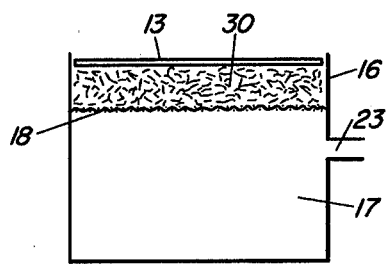
FIG. 5 is a schematic diagram of a first step of the method for expelling excess slurry of the invention using the apparatus of FIGS. 1-4.

The unique method of the invention is best understood with reference to FIGS. 5 to 8. A polyurethane foam pad 30 having a thickness of 10 cm is impregnated with an aqueous slurry of ceramic material, a binder and a thixotropic agent, as described in U.S. Pat. Nos. 4,024,212 and 4,075,303. To the extent not inconsistent with the present invention, the disclosures of both such prior art patents are incorporated herein by reference. The impregnated pad 30 is inserted into the first chamber 16 supported by the screen 18, and the lid is positioned over the pad 30 as shown in FIG. 5. It is desirable for the pad 30 to be slightly larger or equal in size to the top chamber 16 so that a seal is maintained between peripheral edge portions of the pad 30 and sidewalls of the top chamber 16.

Figure 6:
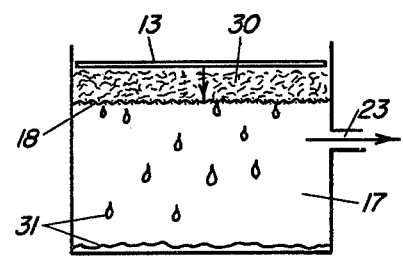
FIG. 6 is a schematic diagram of a second step of the method of the invention.
Figure 7:
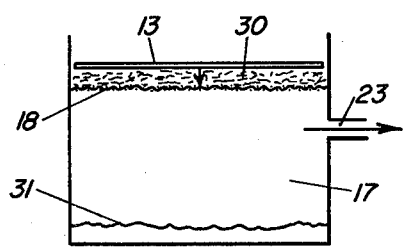
FIG. 7 is a schematic diagram of a third step of the method of the invention.

The vacuum pump 14 is turned on and simultaneously downward pressure is exerted on the lid 13 against the pad 30. Slurry 31 is squeezed downwardly through the wire mesh screen 18, which is impervious to the foam 30. Slurry accumulates on the floor of the lower chamber 17, as shown in FIGS. 6 and 7. For a slurry-impregnated polyurethane foam pad of the dimensions given and a thickness of 10 cm, a total pressure differential of approximately 20 to 30 psi is sufficient to produce the maximum degree of compression shown in FIG. 7. The foam pad 30 is compressed to less than 50% and preferably to about 10 to 20% of its initial volume.

Figure 8:
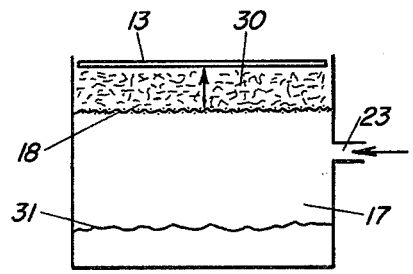
FIG. 8 is a schematic diagram of a fourth step of the method of the invention.
Figure 2:
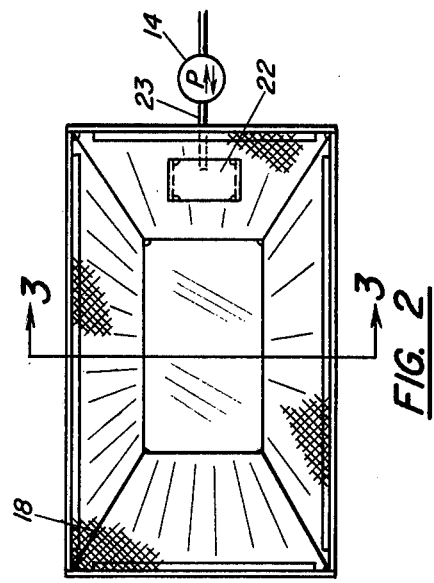
FIG. 2 is a fragmentary top plan view of the apparatus of FIG. 1 with the lid removed.
Figure 4:
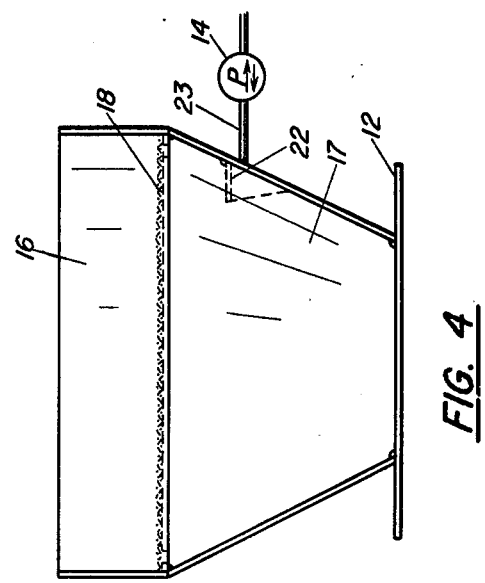
FIG. 4 is a fragmentary front elevational view of the apparatus of FIG. 1 with the lid removed.
Figure 3:
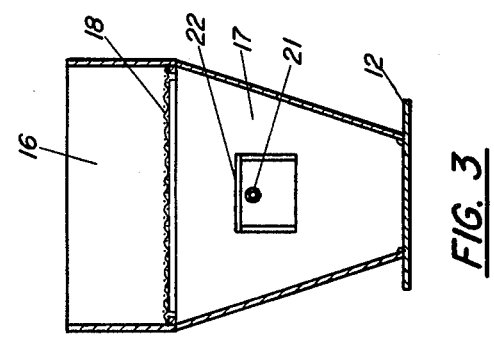
FIG. 3 is a cross-sectional view taken along the lines 3—3 of FIG. 2.

After the pad 30 has been reduced to a preselected maximum degree of compression, downward pressure against the lid 13 is released, and air is allowed to reenter the second chamber 17, as shown in FIG. 8. The polyurethane pad 30 is sufficiently resilient to achieve at least 70% and preferably about 90 to 100% of its initial volume. The pad 30 is removed from the apparatus, and excess slip 31 is either poured through the top opening or drained through a bottom opening (not shown) in the lower chamber 17.

Unlike prior art methods and apparatus which require multiple passes to achieve uniform quality, a single operation of the apparatus of the invention produces an evenly impregnated pad that is consistently free of excess or insufficient slip in the central portion of the foam. The objectionable core effect is entirely eliminated, thereby yielding a ceramic impregnated pad ready for drying and firing without further processing.

While the foregoing description of our invention has been made with reference to a preferred embodiment of our method and apparatus, numerous changes and modifications may be made therein without departing from the spirit and scope of the invention defined by the following claims.

What is claimed is:

1. A method for expelling excess slurry from an organic foam impregnated with a slurry of a ceramic material suspended in a liquid, comprising the steps of
   (a) inserting the organic foam into a first chamber of an apparatus comprising a first chamber, a second chamber adjacent the first chamber, a screen separating the first chamber from the second chamber, said screen being pervious to the slurry and impervious to the organic foam, and compression means adjacent an outer side of the first chamber opposed to an inner side adjacent said screen;
   (b) evacuating the second chamber to withdraw excess slurry through the screen and into the second chamber;
   (c) moving said compression means against the organic foam to compress the organic foam against the screen and to reduce the organic foam to less than 50% of its initial volume; and
   (d) introducing a fluid into the second chamber to restore the organic foam to substantially its initial volume.

2. The method of claim 1 wherein steps (b) and (c) are performed substantially simultaneously.

3. The method of claim 1 wherein said compression means includes a plate generally parallel to the screen, and the step of moving said compression means against the organic foam is performed by pressing said plate inwardly substantially uniformly against an outer side portion of the organic foam opposed to said screen.

4. The method of claim 3 wherein inward pressure against the plate is released contemporaneously with introduction of fluid into the second chamber.

5. The method of claim 1 further comprising the step of
   (e) removing slurry from the second chamber.

6. An apparatus for expelling excess slurry from an organic foam impregnated with a slurry of a ceramic material suspended in a liquid, comprising
   (a) a first chamber for retaining a body of organic foam impregnated with a slurry of ceramic material;
   (b) a second chamber adjacent the first chamber;
   (c) a screen intermediate the first chamber and the second chamber, said screen being pervious to the slurry and impervious to the organic foam;
   (d) compression means spaced from the screen outwardly of the organic foam for pressing the organic foam inwardly against the screen to express excess slurry into the second chamber and to reduce the volume of the body of organic foam to less than 50% of its initial value; and
   (e) fluid pump means communicating with the second chamber for selectively withdrawing fluid from or reintroducing fluid into the second chamber.

7. The apparatus of claim 6 further comprising
   (f) means for withdrawing slurry from the second chamber.

8. The apparatus of claim 6 wherein said compression means comprises a plate generally parallel to the screen.

9. The apparatus of claim 8 wherein said plate and said screen are both generally planar.

10. The apparatus of claim 6 wherein said fluid pump means withdraws fluid from the second chamber contemporaneously with compression of the organic foam against the screen, and reintroduces fluid into the second chamber contemporaneously with release of compression on the organic foam, thereby to restore the body of organic foam to its initial volume.

* * * * *